Oct. 17, 1950 L. J. E. A. DODIN 2,526,204
REFLEX FOCUS DETERMINING VIEW FINDER FOR CAMERAS
Filed Dec. 17, 1947 2 Sheets-Sheet 1
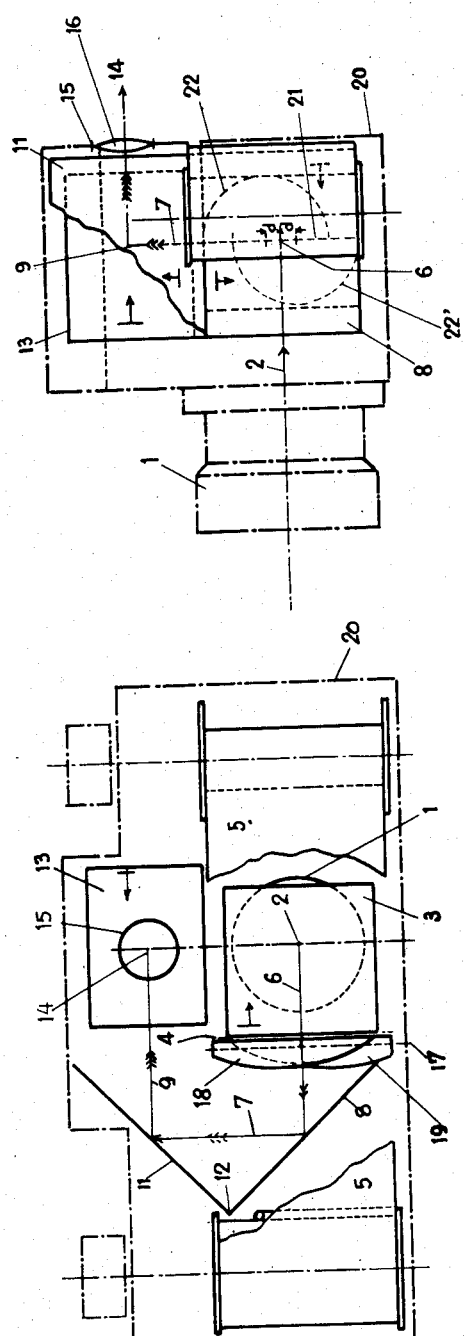
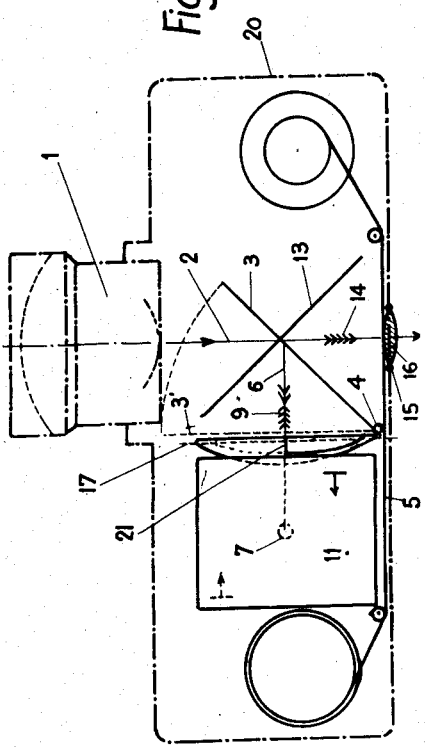

Oct. 17, 1950     L. J. E. A. DODIN     2,526,204
REFLEX FOCUS DETERMINING VIEW FINDER FOR CAMERAS
Filed Dec. 17, 1947     2 Sheets-Sheet 2

Patented Oct. 17, 1950

2,526,204

UNITED STATES PATENT OFFICE 2,526,204

REFLEX FOCUS DETERMINING VIEW FINDER FOR CAMERAS

Lucien Jules Emile André Dodin,
Canet-Plage, France

Application December 17, 1947, Serial No. 792,305
In France December 27, 1946

3 Claims. (Cl. 95—44)

The present invention relates to photographic apparatus of the reflection type.

One advantage of this type of photographic apparatus is that the image of the object or scene contemplated may be accurately framed therein. A particular advantage thereof is that object-glasses with different focal length can be used without having to change the viewfinder for each object-glass.

In contrast therewith, this type of photographic apparatus involves the drawback that the image is generally observed at right angle to the direction of light rays proceeding from the object or scene to be photographed.

Another drawback of this type of apparatus is that the image observed is virtually erect, with the sky above and the ground below, but right side left and left side right. Consequently, if it is desired to follow the object or scene in motion, it will be necessary to displace the apparatus angularly in the sense contrary to that in which the image observed is displaced. This may be annoying, particularly when the photographer is an amateur.

A further inconvenience of this type of apparatus is a loss of intensity of the incident light rays when these are focused upon the ordinary roughly granulated ground glass generally employed in heretofore existing apparatus, especially if the focusing is effected through an operative opening of the diaphragm adjusted to it after a preliminary sighting with a comparatively much larger opening thereof.

It is an object of this invention to provide an improved viewfinder for use in photographic apparatus of the type referred to, which will be free from said drawbacks and can be so combined with the focusing system of such apparatus as to eliminate said inconvenience.

According to one feature of the present invention there is provided, for use in photographic apparatus of the type above referred to, a viewfinder comprising four consecutive light reflectors of which the first one is the usual reflector generally employed in such apparatus and which are so arranged with respect to one another as to allow the light rays emanating from the object or scene sighted upon by the apparatus to be successively reflected sidewise by said reflectors in such a way that the image thereof may be observed, erect and as it is actually, in the direction of said object or seen through a suitable eye-piece provided in the rear wall of said apparatus.

Each of the aforesaid four consecutive reflectors may be for example in the form of a plane mirror, the first plane mirror being adapted to intercept the incident light rays emanating from the object or scene contemplated and being parallel to the axis of object-glass of the apparatus, when this is sighted thereupon, and reflect the same laterally of said axis onto the second plane mirror which in turn is adapted to reflect them upwards onto the third plane mirror disposed perpendicularly to the said second mirror and adapted to reflect them, parallelly to the direction in which they have been reflected by the said first mirror, onto the fourth plane mirror disposed perpendicularly to the said first mirror and adapted to reflect them onto the above said eye-piece. To this end, the said second and third plane mirrors may best be formed to a right-angled dihedron having its edge disposed parallelly to the axis of object-glass and its bisecting plane disposed perpendicularly, on one hand, to the said first plane mirror and, on the other hand, to the said fourth plane mirror.

Desirably, the aforesaid second, third and fourth plane mirrors may be constituted by the sides of appropriate total reflection glass prisms suitably mounted with respect to one another for reflection of the incident light onto the aforesaid eye-piece.

According to a further feature of the present invention there is provided, for use in photographic apparatus of the type above referred to, a viewfinder comprising four consecutive light reflecting surfaces and at least one finely ground light concentrating lens suitably placed between the first light reflecting surface and the second one for rendering uniformly clear the image in point seen by the operator's eye through the aforesaid eye-piece.

According to yet a further feature of the present invention there is provided, for use in photographic apparatus of the type above referred to, a telemetric viewfinder comprising four consecutive light reflecting surfaces and two finely ground light concentrating and stadia lenses suitably placed between the first light reflecting surface and the second one for rendering uniformly clear the image in point seen by the operator's eye through the aforesaid eye-piece and for measuring distances from the object-glass of apparatus to the objects or scenes to be photographed.

Further objects and features of the present invention will be apparent from the following description with reference to the accompanying drawings which show by way of example some embodiments of the invention and in which:

Fig. 1 is a rear view, with parts broken away, of a photographic apparatus comprising a form of viewfinder according to the present invention;

Fig. 2 is a side view, with a part broken away, of the apparatus of Fig. 1;

Fig 3 is a sectional plan view of the apparatus of Figs. 1 and 2;

In these drawings similar numerals of reference indicate like parts throughout the several views.

Figure 4:
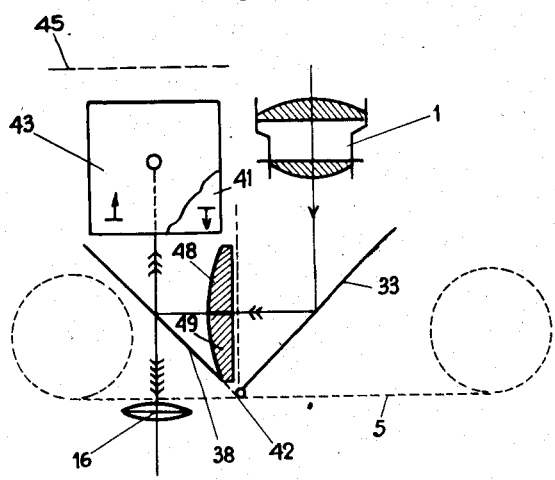
Fig. 4 is an explanatory diagram, with a part broken away, of a further form of viewfinder according to the invention.

Referring first to Figs. 1, 2 and 3, it will be seen that the light ray 2, which emanates from the object or scene contemplated and penetrates axially into the apparatus through the object-glass 1, impinges on the mirror 3 with which it forms an angle of 45° and which may be pivoted into the position 3' on an axle 4 perpendicular to the direction of displacement of the film 5 so that the latter may be exposed to the light, as usually, at the moment of taking the desired picture.

The light ray 2 is reflected from the mirror 3 laterally hereof, as per 6 perpendicular to the said axis. The light ray 6 is in turn reflected upwards, as per 7, by a second mirror 8 and then perpendicularly to it, as per 9, by a third mirror 11. To this end, the mirrors 8 and 11 are formed to a right-angled dihedron having its edge 12 disposed parallelly to the said axis and its bisecting plane disposed perpendicularly to the mirror 3 and hence to the axle 4.

The light ray 9 reflected, as stated, from the mirror 11 impinges on a fourth mirror 13 the plane of which is perpendicular to the plane of the mirror 3 and from which it is reflected, as per 14, onto an eyepiece 16 mounted in a suitable opening 15 cut through the rear wall of the envelope of apparatus diagrammatically shown by dash-and-dot lines 20.

The ensemble comprising the mirrors 3, 8, 11, 13 and eye-piece 16 constitutes a form of improved view-finder designed according to the present invention and suitable for use in photographic apparatus of the type hereinabove referred to, this ensemble permitting the operator's eye placed before the eye-piece 16 to observe the image of the object or scene to be photographed as though the operator were looking at this object directly.

Desirably, the light reflecting mirrors 8, 11 and/or 13 may be formed by the respective sides of suitably assembled total reflection glass prisms.

In order to intensify the light rays 7, 9 and 14, a convergent lens 18—19 is suitably interposed between the mirrors 3 and 8 to concentrate upon the mirror 8 the beam of light 6 emanating from the object or scene to be photographed. This light concentrating lens is composed of two lens-like elements adapted to form stadia lenses intended, in addition to the light concentrating ability thereof, for measuring distances from the object-glass of photographic apparatus to the objects or scenes to be photographed. To this end, the lens is constituted by two semi-lenses 18, 19 separated from each other by a common median for example vertical plane 21 (Fig. 2) and mutually shifted in this plane through a distance d.

The contours of these two semi-lenses, that are not utilized over a rectangular zone corresponding to the image size, may be suitably trimmed for the purpose of reducing their space requirement. The semi-lenses 18 and 19 are diagrammatically indicated in Fig. 2 by two corresponding semi-circles 22, 22' shifted through the distance d upwards and downwards, respectively, from the horizontal plane passing through the axis of object-glass 1.

Preferably, the amount of shifting d will be adjustable so as to secure a telemetric or stadia device having variable power. It will be able to function at its maximum power whatever the position and the optical opening of the object-glass may be. When the excentricity d will be zero, the lens 17—18 calculated for causing the image formed in the object-glass to impinge on the operator's pupil will play its ordinary role.

In order to adjust the power of said telemetric device, any appropriate means may be used by the operator for shifting the semi-lenses 18, 19 with respect to each other, but it is preferable to link the latter by means of suitable cams and levers with the means for controlling the diaphragm mechanism of the object-glass.

In cheaper apparatus the amount of shifting of the semi-lenses may be a fixed one; the focusing will then have to be effected at a determined opening of the object-glass. The semi-lenses, in this case, may be worked up in a plano-convex or biconvex or meniscus system, it being up to the fabricator to take into account these elements in his calculations.

In the case of apparatus having object-glasses with short focal length or interchangeable object-glasses with different focal length the faces of semi-lenses 17, 18 should be slightly and finely ground for rendering uniformly clear the image in point seen by the operator's eye through the aforesaid eye-piece 16.

The telemetric viewfinder illustrated in Figs. 1, 2 and 3 can be easily arranged in the envelope 20 of a photographic apparatus of the reflection type in which the film 5, unwound for example from a discharging reel 23 mounted on a vertical axle 24 (Fig. 1) placed on one side of the central portion of the apparatus, passes behind the mirrors 3, 8 and is wound on a receiving reel 25 mounted on a vertical axle 26 placed on the other side from said central portion.

For the sake of clarity, there have been omitted in the apparatus of Figs. 1, 2 and 3 all usual inside partitions separating the various parts from one another with respect to the light, as well as all usual mechanisms with the exception of what is needed for understanding the invention.

In the form of telemetric viewfinder illustrated in Fig. 4 the incident light ray coming from the object-glass 1 is reflected from the mirror 33, which corresponds to the mirror 3 of Figs. 1 and 3, through the concentrating and stadia lenses 48, 49 similar and disposed similarly to the lenses 17, 18 of Fig. 1, onto the mirror 38 from which it is reflected onto the mirror 41 and herefrom onto the mirror 43 wherefrom it is further reflected onto the eye-piece 16 similar to that of Figs. 1, 2 and 3. To this end, the mirrors 33 and 38 are formed to a right-angled upwardly open dihedron having its edge disposed parallelly to the direction of displacement of the film 5, while the mirrors 41 and 43 are formed to a right-angled dihedron roofing the mirror 38 and having its real or potential edge 45 disposed perpendicularly to the said direction, i. e.

perpendicularly to the edge of dihedron 33—38.

Figure 5:
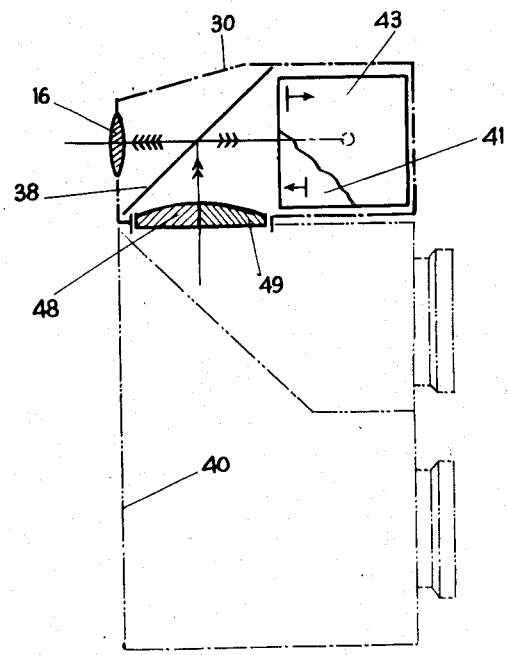
Fig. 5 shows a photographic apparatus comprising a viewfinder of Fig. 4.

The group comprising the mirrors 38, 41, 43, eye-piece 16 and light concentrating stadia lenses 48, 49 may be constructed as a self-contained telemetric viewfinder unit which, when arranged in an envelope 30 indicated by thick dash-and-dot lines in Fig. 5, may be mounted on the top and in place of the horizontal ground glass of a usual photographic apparatus of the reflection type, such as one designated by 40 having for example two object-glasses one for cooperation with the said viewfinder unit and the other for impression of images on the film.

All of the aforesaid reflecting surfaces may be constituted by metal plates, for example polished stainless steel or chromium-plated plates, and they may be so interlinked as to form foldable viewfinders suitable for use either in apparatus specifically designed therefor or in ordinary reflection-apparatus already existing.

The outstanding advantages of telemetric viewfinders designed according to the invention are briefly as follows:

The sighting can be effected level with the operator's eye, in the very direction in which the object or scene is observed. Since the image is erect in all positions of the apparatus about the optical axis of the object-glass, the apparatus can be oriented at will about this axis; this is particularly noteworthy in the case of rectangular sizes that may be utilized at will in height or in width. It is possible, without changing the direction of sighting, to turn the apparatus completely; this, for example in the case of a square size, permits a moderate fixed offset from center utilizable upwards or downwards. The image is uniformly clear, without any granulation and loss of light due to the usual ground glass. Since the telemetric base is always proportional to the opening of the diaphragm, the image remains clear whatever this opening may be, in contrast with the case of the ground glass in existing apparatus of the reflection type having a sole object-glass. Furthermore, since the image is reflected by the basic reflector laterally, the space occupied by the apparatus equipped with the viewfinder of the invention is lesser than that occupied by heretofore known apparatus in which the basic reflector reflects the image upwardly. To conclude, the combination of the telemetric viewfinder of the invention with ordinary photographic apparatus of the type under consideration permits to eliminate the various inconveniences of such apparatus.

It will be understood that the invention is not intended to be restricted to the particular constructions and arrangements of parts of apparatus, herein shown and described, as the same may be modified in various particulars without departing from the spirit and scope of the invention which is intended to be defined in the appended claims.

What I claim is:

1. In a photographic apparatus of the reflection type with a single reflex objective which is capable of displacement parallel to the optical axis thereof, in combination, a reflecting mirror arranged for pivotal motion about an axis in a plane perpendicular to the optical axis; a telemetric device including two half-lenses mutually displaced along their plane of contact in the axial limiting plane of said half-lenses perpendicular to the optical axis; a first fixed mirror arranged in the optical path behind said half-lenses at 45° to the axis of said half-lenses and parallel to the optical axis whereby the rays after passing said half-lenses are reflected under a right angle; a second fixed mirror arranged parallel to the optical axis and at right angles to said first fixed mirror by which the rays are again reflected under a right angle; a third fixed mirror arranged at an angle of 45° to the optical axis by which the rays are reflected parallel to the optical axis; and a film reel having an axle arranged parallel to said pivotal axis of said reflecting mirror, said half-lenses and said first fixed mirror being arranged between said reflecting mirror and said film reel whereby a very compact arrangement and a large reduction of the overall dimensions is obtained.

2. In a photographic apparatus of the reflection type with a single reflex objective which is capable of displacement parallel to the optical axis thereof, in combination, a reflecting mirror arranged for pivotal motion about an axis in a plane perpendicular to the optical axis; a telemetric device including two half-lenses mutually displaced along their plane of contact in the axial limiting plane of said half-lenses perpendicular to the optical axis; a first fixed mirror arranged in the optical path behind said half-lenses at 45° to the axis of said half-lenses and parallel to the optical axis whereby the rays after passing said half-lenses are reflected under a right angle; a second fixed mirror arranged parallel to the optical axis and at right angles to said first fixed mirror by which the rays are again reflected under a right angle; a third fixed mirror arranged at an angle of 45° to the optical axis by which the rays are reflected parallel to the optical axis; an eye piece arranged in the rear of the apparatus behind said third fixed mirror with the axis of said eye piece arranged parallel to the optical axis; and a film reel having an axle arranged parallel to said pivotal axis of said reflecting mirror, said half-lenses and said first fixed mirror being arranged between said reflecting mirror and said film reel whereby a very compact arrangement and a large reduction of the overall dimensions is obtained.

3. In a photographic apparatus of the reflection type with a single reflex objective which is capable of displacement parallel to the optical axis thereof, in combination, a reflecting mirror arranged for pivotal motion about an axis in a plane perpendicular to the optical axis; a telemetric device including two half-lenses mutually displaced along their plane of contact in the axial limiting plane of said half-lenses perpendicular to the optical axis, said half-lenses being plano-convex having finally ground plane surfaces arranged in the same plane parallel to the optical axis and directed toward said reflecting mirror; a first fixed mirror arranged in the optical path behind said half-lenses at 45° to the axis of said half-lenses and parallel to the optical axis whereby the rays after passing said half-lenses are reflected under a right angle; a second fixed mirror arranged parallel to the optical axis and at right angles to said first fixed mirror by which the rays are again reflected under a right angle; a third fixed mirror arranged at an angle of 45° to the optical axis by which the rays are reflected parallel to the optical axis; an eye piece arranged in the rear of the apparatus behind said third fixed mirror with the axis of said eye piece arranged parallel to the optical axis; and a film reel having an axle arranged parallel to said pivotal axis of said reflecting mirror, said half-lenses and said first fixed mirror being arranged between said reflecting mirror and said film reel whereby a very compact arrangement and a large reduction of the overall dimensions is obtained.

LUCIEN JULES EMILE ANDRÉ DODIN.

REFERENCES CITED

The following references are of record in the file of this patent:

UNITED STATES PATENTS

| Number | Name | Date |
|---|---|---|
| 886,739 | Thorner | May 5, 1908 |
| 1,687,030 | Mitchell | Oct. 9, 1928 |
| 1,998,568 | Barenyi | Apr. 23, 1935 |
| 2,048,773 | Baumgartner | July 28, 1936 |
| 2,219,314 | Hoch | Oct. 29, 1940 |
| 2,284,562 | Dittmann | May 26, 1942 |
| 2,341,410 | Mihalyi | Feb. 8, 1944 |
| 2,442,327 | Soreny | May 25, 1948 |

FOREIGN PATENTS

| Number | Country | Date |
|---|---|---|
| 593,035 | Germany | Feb. 20, 1934 |
| 629,564 | Germany | May 14, 1936 |

OTHER REFERENCES

Ser. No. 304,702, Kuppenbender (A. P. C.), published May 4, 1943.